Dec. 5, 1950   G. H. MANSFIELD   2,532,506
HACK SAW OR THE LIKE
Filed Nov. 29, 1947   2 Sheets-Sheet 1
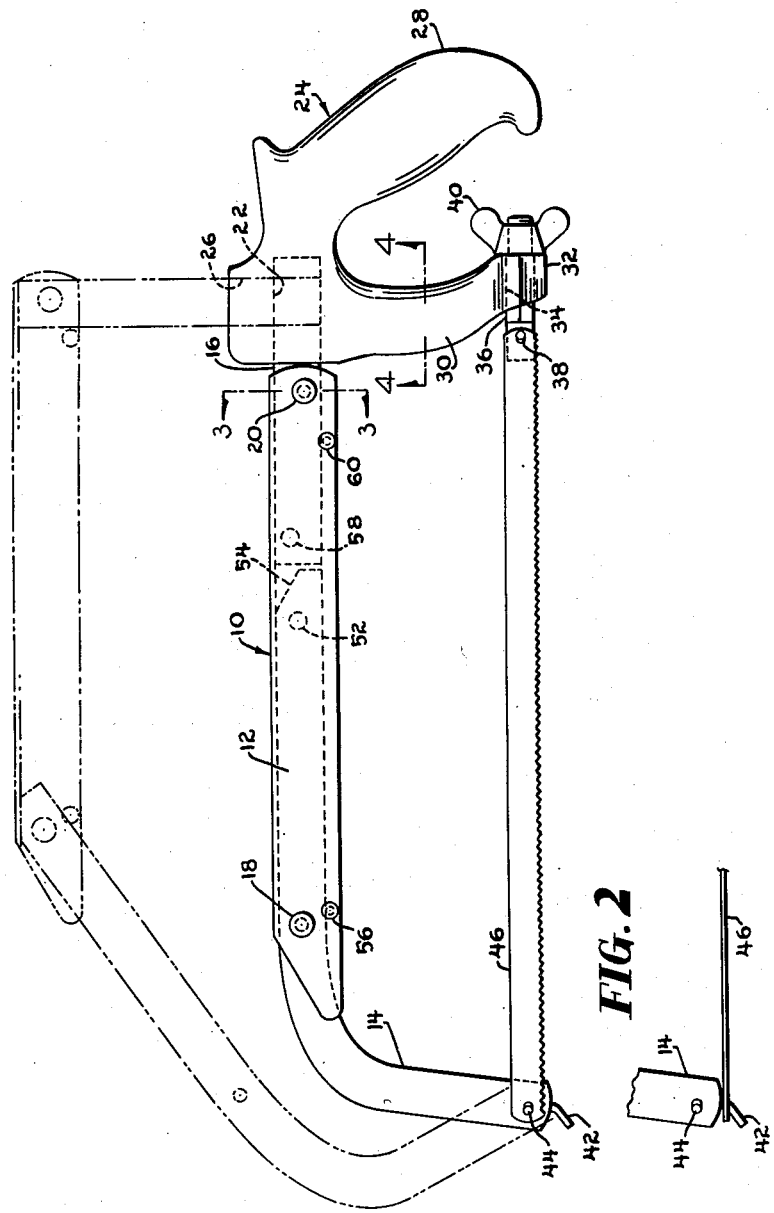
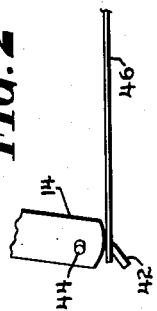
INVENTOR.
GEORGE H. MANSFIELD
BY Oldham & Oldham
Attorneys

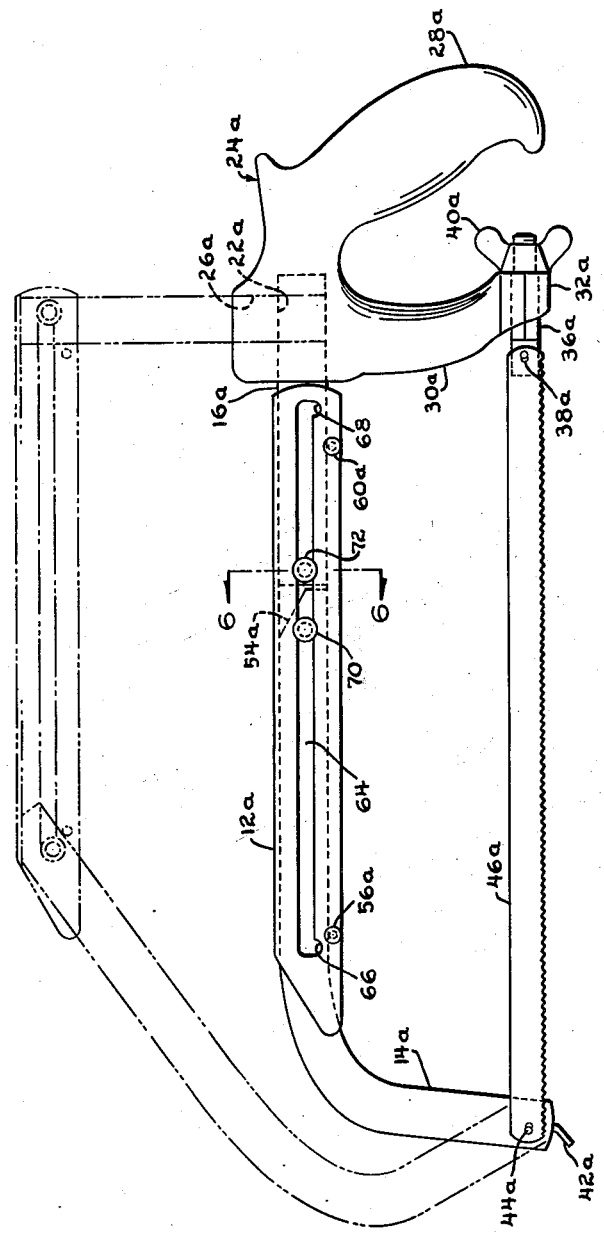

Patented Dec. 5, 1950

2,532,506

UNITED STATES PATENT OFFICE 2,532,506

HACK SAW OR THE LIKE

George H. Mansfield, Akron, Ohio

Application November 29, 1947, Serial No. 788,879

8 Claims. (Cl. 145—34)

This invention relates to hack-saws, or the like, and, more particularly, is concerned with a tool of this type which can be readily adjusted to have a deep or a shallow throat.

Heretofore various hack-saw and like combinations have been patented or offered for sale on the market. However, the usual hack-saw supports the saw blade only three or four inches from the supporting frame, and the result is that the saw can be used to make cuts of only the depth of the throat unless the hack saw is tilted to a very awkward angle. This is quite objectionable when sawing through a plate or sheet of considerable size. Again, even though the saw blade is turned at right angles, as can be done with a number of hack-saws, it is still only possible to saw a relatively narrow strip having a width less than the depth of the saw throat from a plate or sheet of metal or other material.

Moreover, when sawing with known hack-saws during or at the end of the cut, it is a relatively easy thing to barge one's knuckles or fingers on the piece being sawn. Also, known hack-saws are either so inexpensively constructed that they do not stand up in use, or they are so expensively built that they are beyond the reach of the home craftsman.

It is the general object of my invention to avoid and overcome the foregoing and other objections to and difficulties of known hack-saw constructions by the provision of a durable but inexpensive hack-saw which can be readily adjusted by the ordinary person in a few second's time to provide either a deep or a shallow throat mounting for a saw blade.

Another object of my invention is to provide a hack-saw which incorporates a finger and hand guard which eliminates bashing or gouging of the operator's hand when using the saw.

Another object of my invention is to provide an improved hack saw or like combination of rugged, simple construction but adapted to a variety of sawing or other operations heretofore impossible with the conventional type hack-saw or similar tool.

The foregoing objects of my invention, and other objects which will become apparent as the description proceeds, are achieved by the provision of a hack-saw including a frame movable to either a deep or a shallow throat position, the frame comprising a centrally positioned channel, a bar and a member telescoping into opposite ends of the channel, means for locking the bar and member in said telescoping position, means for securing the member and bar to the ends of the channel in positions extending at an angle to the channel, the combination being completed by a pistol grip handle having a pair of recesses, one of which is adapted to receive the bar in each position thereof, and means associated with the member and handle for supporting a saw blade or other tool therebetween. A hand guard is associated with the handle to protect the fingers and hand of the saw operator.

For a better understanding of my invention, reference should be had to the accompanying drawing, wherein:

Fig. 1 is a side elevation of one best known embodiment of a hack-saw incorporating the principles of my invention, the shallow throat position being shown in solid lines and the deep throat position being shown in chain dotted lines;

Fig. 2 is a fragmentary view in side elevation of the saw supporting member of Fig. 1, but illustrating the saw blade in the alternative right angle position;

Fig. 3 is, on enlarged scale, a vertical cross-sectional view taken substantially on line III—III of Fig. 1;

Fig. 4 is a horizontal cross-sectional view taken substantially on line IV—IV of Fig. 1;

Fig. 5 is a view similar to Fig. 1 but illustrating a modification of the invention, this figure also showing in chain dotted lines the frame expanded to deep throat position; and Fig. 6 is, on enlarged scale, a vertical, transverse cross-sectional view taken substantially on line VI—VI of Fig. 5.

In the drawings, the numeral 10 indicates generally a frame which includes a centrally position element 12, generally in the form of an inverted channel, the channel telescopically receiving at one end an L-shaped member 14, and telescopically receiving at its other end a bar 16. The full line showing in Fig. 1 of the drawings illustrates the channel 12, the member 14, and the bar 16, in their shallow frame position. The member 14 and bar 16 are adapted to be secured in place in the channel 12 by any suitable pin or screw means, indicated by the numerals 18 and 20, such means being adapted to extend through aligned apertures in the channel, member and bar. One suitable means to accomplish the indicated result comprises a spring rivet 18 which, as illustrated in Fig. 3, will snap into the aligned apertures, but which can be readily removed and repositioned when it is desired to move the frame members to the deep throat position illustrated in chain dotted lines in Fig. 1.

The end of the bar 16 remote from the channel 12 extends slidably into a longitudinally-directed socket 22 in a handle portion indicated as a whole by the numeral 24. The handle 24 also is formed with an upwardly directed socket 26 which will receive the end of the bar 16 when the frame is expanded to deep throat position.

The handle 24 is formed of inverted U-shape, one leg 28 comprising a pistol grip, and the other leg 30 extending downwardly and terminating in a boss or eye 32 having a square bore 34 therein which slidably receives a square pin 36, one end of which is formed with a flat ended pin 38 and the other end of which is threaded to receive a wing nut 40.

The L-shaped member 14 is formed with a downwardly extending pin 42 and a laterally-directed pin 44 either of which is adapted to serve as an anchoring means for the end of a hack-saw blade or other tool 46, the other end of the blade being secured to the pin 38. Tightening the wing nut 40 will secure the blade in place and will simultaneously stress the entire frame 10 to very rigidly mount the saw blade or other tool.

An important feature of my invention is the provision on the leg 30 of the handle of laterally extending flanges 50, and shown in Fig. 4, which flanges have substantially a constant width but which taper at their ends to blend into the handle at the top and bottom of the leg. These flanges function to provide a guard for the fingers and hand of the operator of the assembly.

In converting the shallow throat hack-saw assembly, as just described, to the deep throat arrangement shown in chain dotted lines in Fig. 1, it is only necessary to loosen the wing nut 40 at which time the fastening means 18 and 20 are more readily removed from the frame. Removal of the fastening means 18 and 20 allows the member 14 to be moved outwardly in the channel 12 and to an oblique angle with respect thereto, whereupon the fastening means 18 is re-inserted through the same holes in the channel, and through an aperture 52 in the end of the L-shaped member 14. The end of the L-shaped member 14 is also beveled, as at 54, the bevel engaging with the bottom of the channel 12 and serving with the fastening means 18 in place to lock the member 14 at the oblique angle indicated in the chain dotted lines.

To assist in strengthening the frame with the parts in the deep throat position, preferably a rivet 56 is permanently secured between the flanges of the channel 12 so that the rivet will not interfere with the sliding movement of the member 14 in and out of the channel, but with the rivet acting to engage with the underside of the member 14 to further assist in holding the member firmly in the oblique position illustrated. The bar member 16 is removed from the socket 22 in the handle 24 and is repositioned in the socket 26 of the handle. The fastening means 20 is then inserted through the same openings in the end of the channel 12, and through an aperture 58 in the end of the bar 16. This end of the channel is also preferably strengthened by permanently securing a rivet 60 between the bottom flanges of the channel 12, which rivet is adapted to strike the side of the bar 16 with the parts in the deep throat position, but with the rivet not interfering with the sliding movement of the bar 16 with respect to the channel. Retightening the wing nut 40 will now secure the entire assembly in the deep throat position illustrated.

The embodiment of the invention illustrated in Figs. 5 and 6 is similar to that heretofore described and hence like reference numerals have been employed, except that the suffix "a" has been added. The assembly includes a channel 12a, and L-shaped member 14a, a bar 16a, a handle 24a, and a blade 46a. The only real difference in the modification of Figs. 5 and 6 is that the channel 12a is formed with longitudinally extending slots 64 on each side, which slots terminate at their ends in locking offsets 66 and 68. Rivets 70 and 72 are fastened in apertures near the ends of the members 14a and 16a, with the heads of the rivets lying outside the channel 12a, and the shanks of the rivets riding in the grooves 64 in each side of the channel.

In full lines is illustrated the arrangement of the parts when the hack-saw is assembled to shallow throat relation, and in this case when the wing nut 40a is tightened the rivets 70 and 72 slide in the slots 64 to allow the member 14a to abut against the end of the member 16a whereupon the blade 46 and the entire frame assembly is tightened firmly together. It will be understood that rivets 56a and 60a extending between the bottom flanges of the channel 12a assist in holding the assembly together.

In order to change the assembly to the deep throat position in chain dotted lines in Fig. 5, the wing nut 40a is released, the member 14a is moved outwardly in the channel 12a with the rivet 70 sliding in the slots 64 until the rivet falls into the lateral off-sets 66 at the end of the slots 64. At this time, the bevel 54a and the rivet 56a serve to position the member 14a at the oblique angle illustrated. In a like manner, the rivet 72 slides in the slots 64 until it falls into the offset portions 68 thereof, and the bar 16a is removed from the socket 22a in the handle and is positioned in the socket 26a. The rivet 60a again assists in holding the channel 12a and the bar 16a in substantially the right angle position shown. Now tightening the wing nut 40a will again draw the frame and blade tightly into a rigid assembly, and the saw is ready for use.

It will be understood that the blades 46 and 46a of either form of the invention illustrated may be turned to lie in a plane at right angles to that illustrated in which case the blade is mounted on the pin 42 or 42a rather than the pin 44 or 44a, and with the square post 36 being turned through 90° in the eye 32 or 32a.

From the foregoing it will be recognized that the various objects of my invention have been achieved by the provision of a simple, easily assembled or repositioned hack-saw which will have either a deep or a shallow throat as desired. My improved saw includes a finger and hand guard which prevents bashing or gouging of the operator's hand when in use. The assembly is rugged and durable, is relatively inexpensive, and fulfills the requirements of the home craftsman or the skilled mechanic equally well in providing a tool which will last for years, which can do a wider variety of jobs than heretofore thought possible, and yet which is within the pocketbook range of all.

Instead of the channels 12 and 12a, I may employ a tube having substantially a rectangular shape in cross-section and adapted to slidably receive the member 14 or 14a and bar 16 or 16a.

The invention has been described primarily in conjunction with the mounting of a hack-saw blade, but it should be understood that the principles of the invention are adaptable to the support of other tools or blades than hack-saw blades, and, accordingly, I do not wish my invention limited to the support of a hack-saw blade only.

While in accord with the patent statutes, I have specifically illustrated and described at least one embodiment of my invention, it is to be particularly understood that I am not to be limited thereto or thereby, but that the scope of my invention is defined in the appended claims.

I claim:

1. A hack saw or the like comprising an inverted U-shaped handle portion, one leg of the U comprising a pistol grip, the other leg of the U terminating in an eye having a square bore therein, the side of the last-named leg nearest to the pistol grip being outwardly flared to provide a guard for fingers grasping the pistol grip, said handle portion having a pair of sockets at right angles to each other open to the periphery of the handle portion near the base of the U, a bar adapted to be received in either socket, a channel receiving the outwardly extending end of the bar, means securing the channel to the bar, an L-shaped bar received in the other end of the channel, means for securing the L-shaped bar either with one leg thereof in alignment with the channel or at an angle thereto, blade fastening means on the end of the L-shaped bar, fastening means having a square periphery slidably received in the eye of the handle portion, a saw carried between the fastening means, and a wing-nut screwed onto a rounded end of the square-bodied fastening means for tightening the whole assembly on the handle portion.

2. A hack saw or the like comprising a handle portion of inverted U-shape, said handle portion having a pair of sockets at right angles to each other open to the periphery of the handle portion near the base of the U, a bar adapted to be received in either socket, a channel receiving the outwardly extending end of the bar, means securing the channel to the bar, an L-shaped bar received in the other end of the channel, means for securing the L-shaped bar either in alignment with the channel or at an angle thereto, blade fastening means on the end of the L-shaped bar, fastening means having a square periphery slidably received in the handle portion, a saw carried between the fastening means, and a wing-nut screwed onto a rounded end of the square-bodied fastening means for tightening the whole assembly on the handle portion.

3. A hack saw or the like comprising a handle portion of inverted U-shape, said handle portion having a pair of sockets at right angles to each other open to the periphery of the handle portion near the base of the U, a bar adapted to be received in either socket, a channel receiving the outwardly extending end of the bar, means securing the channel to the bar, an L-shaped bar received in the other end of the channel, means for securing the L-shaped bar either in alignment with the channel or at an angle thereto, blade fastening means on the end of the L-shaped bar, fastening means slidably received in the handle portion, a saw carried between the fastening means, and means for tightening the whole assembly on the handle portion.

4. A hack saw or the like including a channel shaped frame, an L-shaped member, means for securing said member to one end of the frame in an oblique position or for securing it with one leg thereof in a telescoped, longitudinal alignment position, a bar, means for securing the bar in telescoped relation and longitudinal alignment with the other end of the frame or at substantially right angles to said other end of the frame, a handle receiving the end of the bar remote from the frame, a saw blade secured to the end of the L-shaped member remote from the frame, and means on the handle for securing and drawing towards the handle the other end of the blade, said frame, member and bar adjustments allowing the assembly to have either a deep or a shallow throat.

5. A hack saw or the like including a frame, an L-shaped member, means for securing said member to one end of the frame in an oblique position or for securing it in a shortened position with one leg thereof in longitudinal alignment with said frame, a bar, means for securing the bar in shortened relation and longitudinal alignment with the other end of the frame or at substantially right angles to said other end of the frame, a handle receiving the end of the bar remote from the frame, a tool blade secured to the end of the L-shaped member remote from the frame, and means on the handle for securing and drawing towards the handle the other end of the blade, said frame, member and bar adjustments allowing the assembly to have either a deep or a shallow throat.

6. A hack saw including a frame movable to either a deep or a shallow throat position, said frame comprising a centrally-positioned channel, a bar and a member telescoping into opposite ends of the channel, means for locking the bar and member in said telescoped position, means for securing the member and bar to the ends of the channel in positions extending at an angle to the channel, a pistol grip handle having a pair of recesses, one of said recesses being adapted to receive the bar in each of the two said positions thereof, a hand guard on the handle, and means associated with the member and handle for supporting and tensioning a saw blade therebetween.

7. A hack saw including a frame movable to either a deep or a shallow throat position, said frame comprising a centrally-positioned channel, a bar and a member telescoping into opposite ends of the channel, means for locking the bar and member in said telescoped position, means for securing the member and bar to the ends of the channel in positions extending at an angle to the channel, a handle having a pair of recesses, one of said recesses being adapted to receive the bar in each of the two said positions thereof, and means associated with the member and handle for supporting and tensioning a saw blade therebetween.

8. A hack saw including a frame movable to either a deep or a shallow throat position, said frame comprising a centrally-positioned channel, a bar and a member telescoping into opposite ends of the channel, means for locking the bar and member in said telescoped position, means for securing the member and bar to the ends of the channel in positions extending at an angle to the channel, fixed pins carried by the channel and against which the bar and member are braced when in their angular position, a pistol grip handle having a pair of recesses, one of said recesses being adapted to receive the bar in each of the two said positions thereof, and means associated with the member and handle for supporting and tensioning a saw blade therebetween.

GEORGE H. MANSFIELD.

REFERENCES CITED

The following references are of record in the file of this patent:

UNITED STATES PATENTS

| Number | Name | Date |
| --- | --- | --- |
| 1,078,821 | Biggs | Nov. 18, 1913 |
| 1,429,195 | Donaldson | Sept. 12, 1922 |
| 1,835,638 | Cunneen | Dec. 8, 1931 |
| 2,320,511 | Curry | June 1, 1943 |